No. 619,576. Patented Feb. 14, 1899.
J. T. JOHNSON.
GATE.
(Application filed Aug. 5, 1898.)
(No Model.)

Witnesses
Harry L. Amer.
K. A. Nau

Inventor
James T. Johnson.
by V. D. Stockbridge
his Attorney.

THE NORRIS PETERS CO., PHOTO-LITHO., WASHINGTON, D. C.

UNITED STATES PATENT OFFICE.

JAMES T. JOHNSON, OF POMONA, MICHIGAN, ASSIGNOR OF ONE-HALF TO SAMUEL J. DRUCE, OF SAME PLACE.

GATE.

SPECIFICATION forming part of Letters Patent No. 619,576, dated February 14, 1899.

Application filed August 5, 1898. Serial No. 687,805. (No model.)

*To all whom it may concern:*

Be it known that I, JAMES T. JOHNSON, a citizen of the United States, residing at Pomona, in the county of Manistee and State of Michigan, have invented certain new and useful Improvements in Gates; and I do hereby declare the following to be a full, clear, and exact description of the invention, such as will enable others skilled in the art to which it appertains to make and use the same.

This invention relates to certain improvements in farm or road gates, the object being to provide in a simple and inexpensive manner a gate which can be opened to permit of the passage of vehicles or live stock and which is so arranged that it may be raised and held at any desired elevation, so that the passage of large animals is obstructed, yet permitting the free passage of smaller animals.

The invention comprises certain novel features of construction and arrangement of parts whereby it is made simpler, cheaper, and otherwise better adapted for the purposes for which it is intended and whereby other important advantages are attained, as will be hereinafter fully described, and specifically defined in the appended claims.

Figure 1:
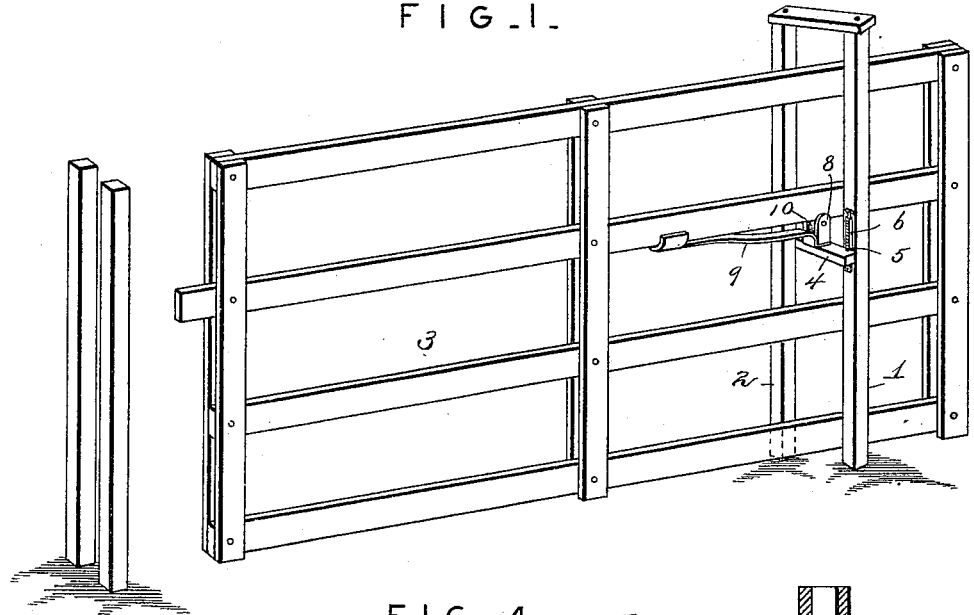
Figure 2:
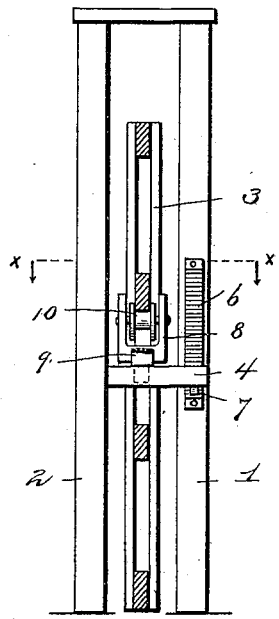
Figure 4:
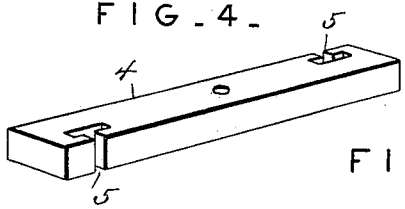
Figure 3:
Figure 5:
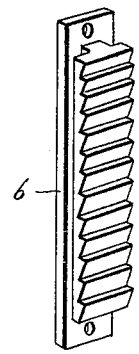
Figure 6:
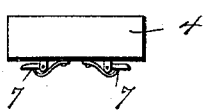
Figure 7:
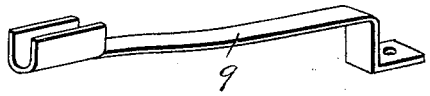

In the accompanying drawings, Figure 1 represents a perspective view of the improved gate. Fig. 2 represents a vertical section through the gate, taken on a line in advance of the supporting posts and rail. Fig. 3 is a horizontal section taken on the line $xx$, Fig. 2. Fig. 4 is a perspective view, enlarged, of the supporting-rail. Fig. 5 is a similar view of one of the rack-bars connecting the supporting-rail with the gate-posts. Fig. 6 is an end view of the supporting-rail, showing the pawls engaging the rack-bars in side elevation. Fig. 7 is a perspective view of the supporting-spring connected with the supporting-rail and the pintle upon which the gate turns.

Similar reference-numerals indicate corresponding parts in all the figures of the drawings.

1 and 2 indicate two posts which are securely anchored in the ground at one side of the road, being arranged one slightly in advance of the other and in such manner that a space is left between them to receive the gate 3.

The gate 3 may be constructed in any of the desired or well-known ways; but in this instance it is shown as a frame composed of vertical and horizontal bars, between two of which latter a supporting-beam 4 is arranged. The supporting-beam is provided at each end and on opposite sides with grooves 5, which engage guide-blocks 6, secured to the posts 1 and 2, and the said guide-blocks are provided with a series of teeth, with which spring-pawls 7, pivotally secured to the under side of the supporting-beam 4, engage, so that when the supporting-block is moved to raise the gate these pawls will engage with the teeth referred to and so support the gate above the level of the road.

It will be observed by reference to Fig. 3 of the drawings that the guide-blocks 6 are grooved at each side and the supporting-beam 4 is so arranged that projections or extensions thereon will engage in said grooves and prevent a lateral movement to the supporting-beam, and thus prevent any possible chance of displacement to the gate.

The intermediate portion of the supporting-beam is provided with an opening to receive the pintle of a swiveling support 8, upon which the gate is swung, and a flat spring 9 is secured to the swiveling support at one end, and the other end is provided with a recess to receive within it the lower edge of one of the horizontal bars referred to. The upper extremity of the swiveling support is provided with a grooved pulley 10, upon which the lower edge of the same horizontal bar will rest while the gate is being moved, and thus give further movement to the gate.

For ordinary use the gate is adjusted to swing clear of the ground; but when it is desired to raise the gate to any predetermined elevation the supporting-beam is adjusted or moved upwardly upon the post, carrying with it the swiveling-support spring and gate, the pawls upon the supporting-beam engaging the teeth upon the guide blocks or ways serving to hold the gate at the desired adjustment until the pawls are released for lowering it to its normal or ordinary position. In some cases it may be desired to only partially open the gate, in which event the latter may be drawn backward endwise upon the swiveling support and spring and will remain in such position until closed again, as will be readily understood. The arrangement of the spring relative to the swiveling support is such as to permit this endwise adjustment of the gate within certain limits; but when the gate is to be opened for the passage of vehicles it can be swung from its ordinary position into a plane parallel with the supporting-beam, the arrangement of the divided post with the parts thereof, one in advance of the other, permitting this movement of the gate.

It will thus be seen that my invention provides in a simple and inexpensive manner a gate which is particularly well adapted for country cross-roads or farms, where it may be desired to allow small animals to pass through, while it may be desired to prevent the passage of larger animals. It is obvious also that the parts by reason of their simplicity are not liable to get out of order.

Modifications may be made without departing from the essential features of my invention, and I do not wish to be understood as limiting myself to the precise details of construction herein shown and described, but reserve the right to make such changes and alterations therein as may fairly fall within its spirit and scope.

Having thus described my invention, what I claim, and desire to secure by Letters Patent, is—

1. The combination with a gate, of a divided or double post, the parts of which are arranged one in advance of the other and one upon each side of the gate, a horizontal supporting-beam connecting the parts of said post and vertically adjustable thereon, means carried by said beam for automatically engaging the post and holding the beam at the desired adjustment, and a swiveling support journaled in said beam and adjustable therewith, and upon which the gate is movably supported, substantially as described.

2. A divided gate-supporting post, the parts of which are arranged one in advance of the other, a gate-supporting beam connecting and adjustable upon the parts of said post, a swiveling gate-support journaled in and vertically adjustable with said beam, toothed guides on said post permitting the vertical adjustment of said beam and swiveling support, and spring-actuated pawls on said beam engaging the teeth on said guides for holding the beam and gate at the desired adjustment, substantially as described.

3. The combination with a divided gate-post, of a gate-supporting beam connecting the parts of said post and vertically adjustable thereon, a swiveling gate-support journaled in and adjustable with said beam, a spring connected to and moving with said swiveling support, and a gate upheld by said swiveling support and spring and adjustable endwise thereon, substantially as described.

In testimony whereof I affix my signature in presence of two witnesses.

JAMES T. JOHNSON.

Witnesses:
HENRY CRAWFORD,
ALONZO CHUBB.